(12) United States Patent
Urushiyama

(10) Patent No.: US 12,055,268 B2
(45) Date of Patent: Aug. 6, 2024

(54) HIGH-PRESSURE CONTAINER AND METHOD OF MANUFACTURING HIGH-PRESSURE CONTAINER

(71) Applicant: HONDA MOTOR CO., LTD., Tokyo (JP)

(72) Inventor: Yuta Urushiyama, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 17/838,433

(22) Filed: Jun. 13, 2022

(65) Prior Publication Data
US 2022/0403978 A1    Dec. 22, 2022

(30) Foreign Application Priority Data
Jun. 17, 2021    (JP) ................. 2021-101139

(51) Int. Cl.
*F17C 1/06*      (2006.01)
(52) U.S. Cl.
CPC ........ *F17C 1/06* (2013.01); *F17C 2201/0109* (2013.01); *F17C 2203/0604* (2013.01);
(Continued)
(58) Field of Classification Search
CPC ............. F17C 1/06; F17C 2201/0109; F17C 2203/0604; F17C 2203/0665;
(Continued)

(56) References Cited

U.S. PATENT DOCUMENTS

| 8,740,009 B2 * | 6/2014 | Otsuka .............. F17C 1/04 29/446 |
| 2012/0037745 A1 | 2/2012 | Aiyama |

(Continued)

FOREIGN PATENT DOCUMENTS

| CN | 1182385 A | 5/1998 |
| CN | 102011933 A | 4/2011 |

(Continued)

OTHER PUBLICATIONS

English Machine Translation of CN-112481773 (Year: 2021).*
(Continued)

*Primary Examiner* — John K Fristoe, Jr.
*Assistant Examiner* — Laura E. Parker
(74) *Attorney, Agent, or Firm* — Carrier, Shende & Associates P.C.; Joseph P. Carrier; Jeffrey T. Gedeon

(57) ABSTRACT

A high-pressure container includes a liner and a fiber layer formed of reinforcing fibers wound around an outer periphery of the liner. The fiber layer has a plurality of hoop layers in which reinforcing fibers are wound in the circumferential direction of the liner to reinforce the body portion. The reinforcing fibers used for a first hoop layer from an inner peripheral side of the fiber layer or the first hoop layer and one or more hoop layers subsequent to the first hoop layer, among the plurality of hoop layers, have a structure in which a plurality of filaments are twisted so as to be inclined with respect to a fiber bundle direction, and have a property of more easily elongating than the reinforcing fibers used for the hoop layer that is located on an outer peripheral side of the fiber layer.

7 Claims, 12 Drawing Sheets

(52) U.S. Cl.
CPC ................ *F17C 2203/0665* (2013.01); *F17C 2209/2154* (2013.01)

(58) Field of Classification Search
CPC ........ F17C 2203/0668; F17C 2203/067; F17C 2203/0663–0673; F17C 2209/2154–2154
USPC ........................................................ 220/589
See application file for complete search history.

(56) References Cited

U.S. PATENT DOCUMENTS

| | | | |
|---|---|---|---|
| 2013/0299505 | A1 | 11/2013 | Otsubo et al. |
| 2019/0390821 | A1* | 12/2019 | Katano ..................... F17C 1/06 |
| 2020/0141538 | A1* | 5/2020 | Umetsu ..................... F17C 1/00 |
| 2021/0088183 | A1 | 3/2021 | Middendorf |
| 2022/0381400 | A1* | 12/2022 | Mencattelli ............... F17C 1/00 |

FOREIGN PATENT DOCUMENTS

| | | | | | |
|---|---|---|---|---|---|
| CN | 102414011 | A | | 4/2012 | |
| CN | 103009729 | A | | 4/2013 | |
| CN | 103117123 | A | | 5/2013 | |
| CN | 104685117 | A | | 6/2015 | |
| CN | 112481773 | A | * | 3/2021 | ............. B29C 70/24 |
| CN | 112481773 | A | | 3/2021 | |
| EP | 0 810 081 | A1 | | 12/1997 | |
| EP | 3 434 962 | A1 | | 1/2019 | |
| EP | 3434962 | A1 | * | 1/2019 | ............... F17C 1/06 |
| JP | S61-075836 | A | | 4/1986 | |
| JP | H07-205312 | A | | 8/1995 | |
| JP | 2001-141191 | A | | 5/2001 | |
| JP | 2008-045660 | A | | 2/2008 | |
| JP | 2010-223243 | A | | 10/2010 | |
| JP | 2012-241183 | A | | 12/2012 | |
| JP | 2017-025216 | A | | 2/2017 | |
| JP | 2020-085095 | A | | 6/2020 | |
| JP | 2020-151935 | A | | 9/2020 | |
| WO | 2014/058513 | A2 | | 4/2014 | |

OTHER PUBLICATIONS

English Machine Translation of EP-3434962 (Year: 2019).*
Office Action dated May 9, 2023 issued over the corresponding Chinese Patent Application No. 202210692909.2 with the English translation thereof.
Office Action dated Jun. 18, 2024 issued in the corresponding Japanese Patent Application No. 2021-101139 with the English machine translation thereof.

* cited by examiner

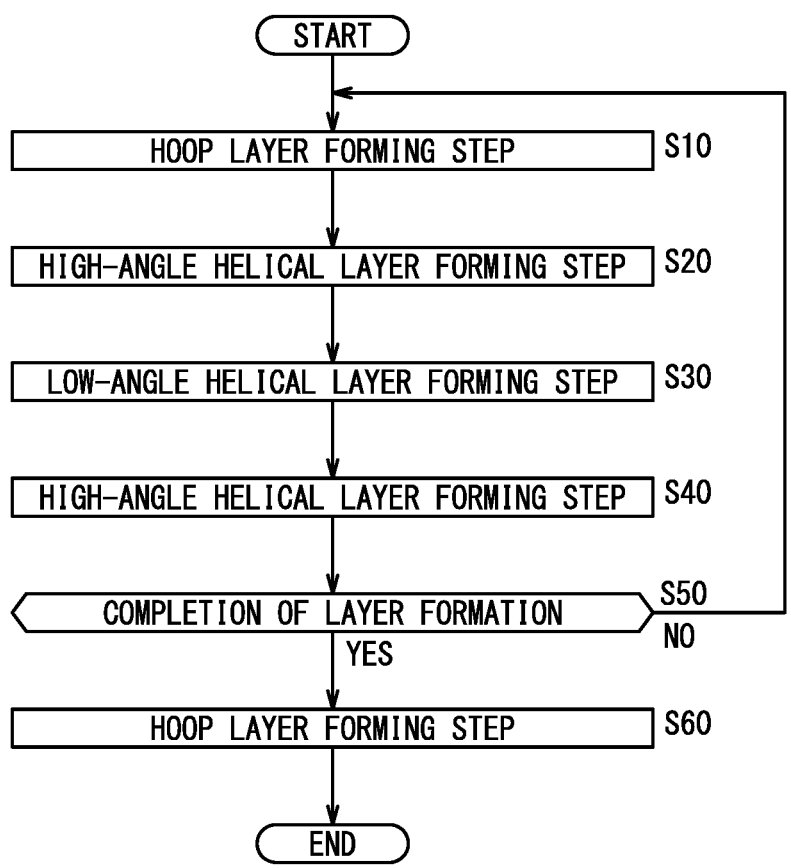

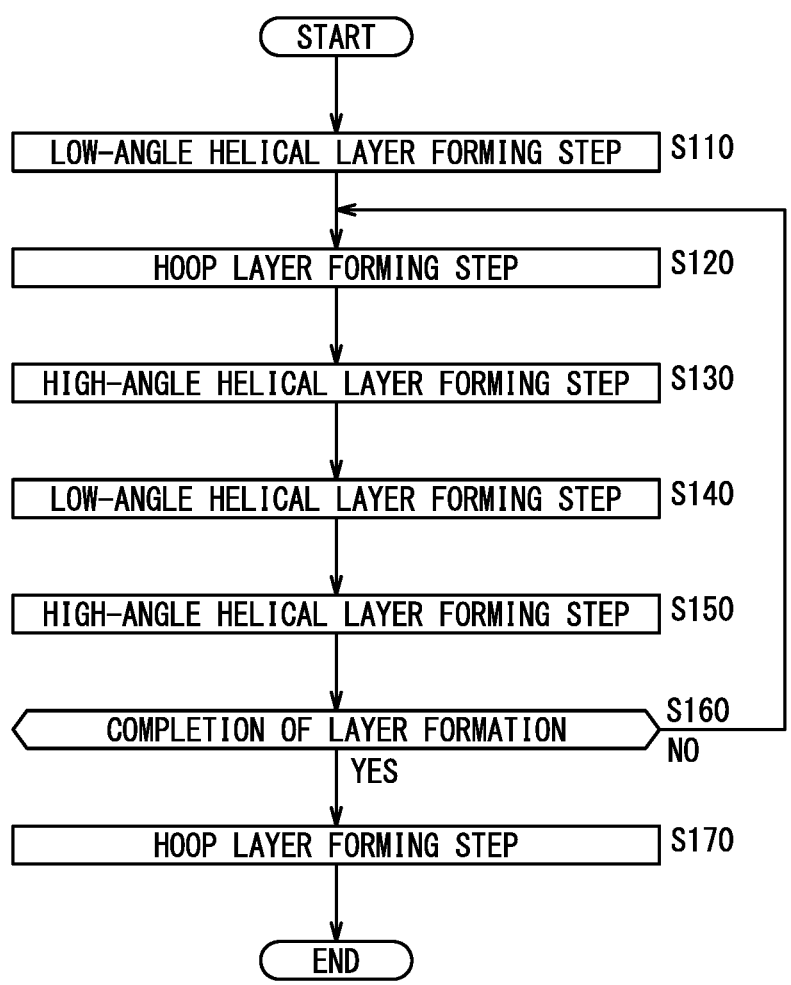

HIGH-PRESSURE CONTAINER AND METHOD OF MANUFACTURING HIGH-PRESSURE CONTAINER

CROSS-REFERENCE TO RELATED APPLICATIONS

This application is based upon and claims the benefit of priority from Japanese Patent Application No. 2021-101139 filed on Jun. 17, 2021, the contents of which are incorporated herein by reference.

BACKGROUND OF THE INVENTION

Field of the Invention

The present invention relates to a high-pressure container having a reinforcing structure in which a fibrous material is wound, and a method for manufacturing the high-pressure container.

Description of the Related Art

A high-pressure container is used for storing hydrogen gas or the like. The high-pressure container has a fiber layer obtained by reinforcing fibers being wound by a filament winding method.

For example, JP 2020-151935 A discloses a winding method of reinforcing fibers constituting a fiber layer.

SUMMARY OF THE INVENTION

When the high-pressure container is filled with a high-pressure gas, a stress acts on the reinforcing fibers in a direction in which the reinforcing fibers constituting the fiber layer are stretched in the circumferential direction, due to the internal pressure. The stress due to the internal pressure distorts (stretches) the reinforcing fibers in the circumferential direction. When the internal pressure reaches the burst pressure, the reinforcing fibers are broken from a portion thereof that is subjected to the greatest distortion.

In the conventional high-pressure container, the burst pressure is reached when the most greatly distorted portion is ruptured. Therefore, in the conventional high-pressure container, the burst pressure is reached before most of the reinforcing fibers reach the limit of the performance, and there is a problem that the performance of the reinforcing fibers is not effectively utilized.

An object of the present invention is to solve the aforementioned problem.

According to an aspect of the present invention, there is provided a high-pressure container including: a liner including a cylindrical body portion and hemispherical closing portions configured to close one end and another end of the body portion respectively; and a fiber layer made up of reinforcing fibers wound around an outer periphery of the liner. The fiber layer includes: a plurality of hoop layers in which the reinforcing fibers are wound in a circumferential direction of the liner in order to reinforce the body portion; and a plurality of helical layers in which the reinforcing fibers are wound so as to be inclined with respect to an axial direction of the liner in order to reinforce the closing portions, and the reinforcing fibers used for a first hoop layer from an inner peripheral side of the fiber layer or for the first hoop layer and one or more hoop layers subsequent to the first hoop layer, among the plurality of hoop layers, have a structure in which a plurality of filaments are twisted so as to be inclined with respect to a fiber bundle direction, and have a property of more easily elongating than the reinforcing fibers used for the hoop layer that is located on an outer peripheral side of the fiber layer.

According to another aspect of the present embodiments, there is provided a method of manufacturing a high-pressure container in which a fiber layer is formed by winding reinforcing fibers around a liner including a cylindrical body portion and hemispherical closing portions that close one end and another end of the body portion respectively, the method including a fiber layer forming step of forming the fiber layer by repeating steps a plurality of times, the steps including: a reinforcing fiber forming step of forming the reinforcing fibers by bundling a plurality of filaments; a hoop layer forming step of forming a hoop layer by winding the reinforcing fiber in a circumferential direction of the body portion of the liner; and a helical layer forming step of forming a helical layer that reinforces the closing portions, by winding the reinforcing fiber in a direction inclined with respect to an axial direction of the liner while forming the reinforcing fiber by bundling the plurality of filaments; wherein the reinforcing fibers used for a first hoop layer from an inner peripheral side of the fiber layer or for the first hoop layer and one or more hoop layers subsequent to the first hoop layer, among the plurality of hoop layers, are formed by twisting a plurality of filaments so as to be inclined with respect to a fiber bundle direction, in the reinforcing fiber forming step, and thereby have a property of more easily elongating than the reinforcing fibers used for the hoop layer that is located on an outer peripheral side of the fiber layer.

According to the high-pressure container and the method of manufacturing a high-pressure container in the above aspects, the performance of the reinforcing fiber can be effectively utilized, and thus the amount of the reinforcing fiber used can be reduced.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 9 is a flowchart illustrating a process of forming a fiber layer according to the first embodiment;

FIG. 11 is a flowchart showing a process of forming a fiber layer according to a fourth embodiment;

DESCRIPTION OF THE INVENTION

First Embodiment

Figure 1:
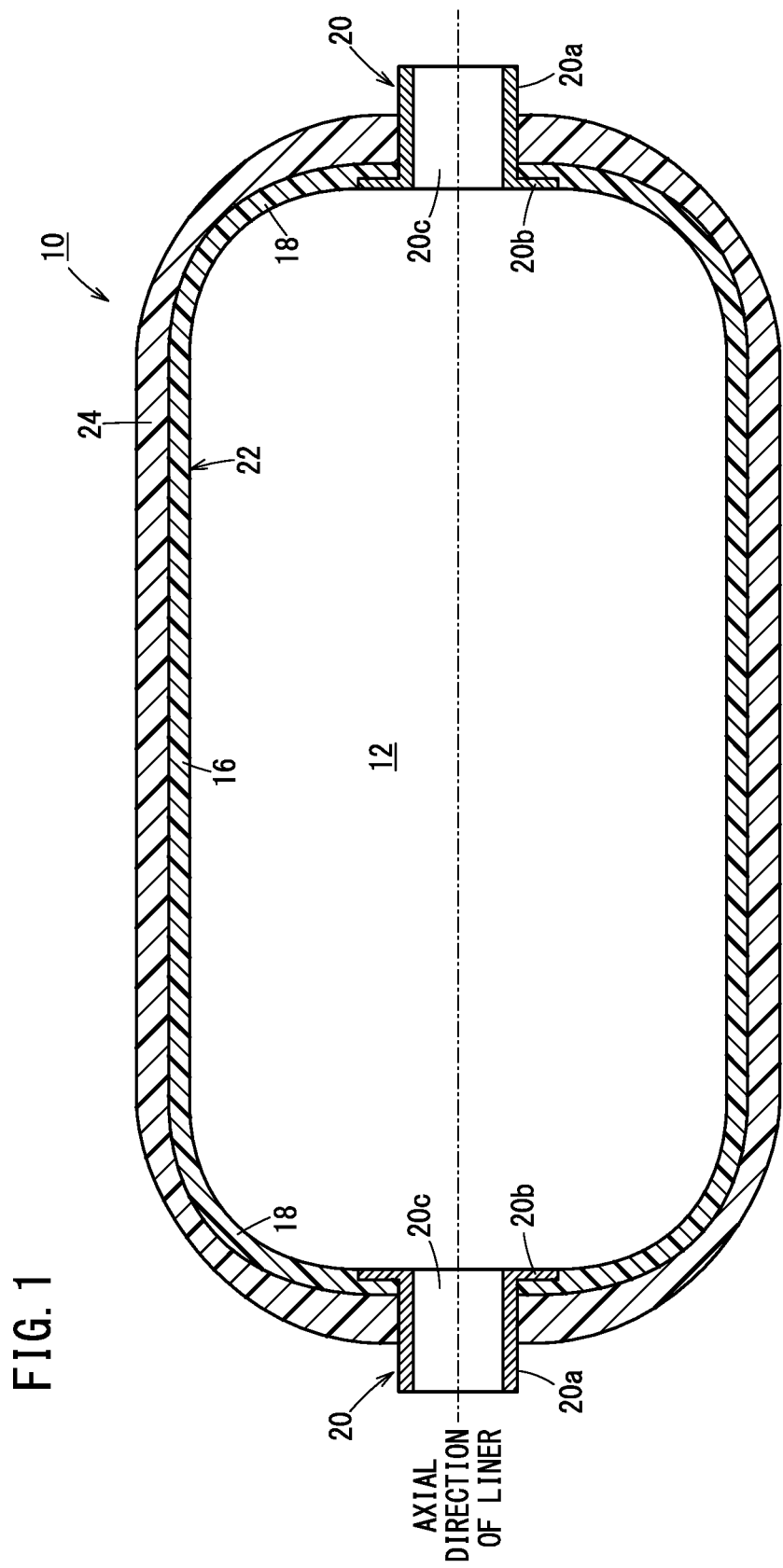
FIG. 1 is a vertical cross-sectional view of a high-pressure container according to an embodiment.

As shown in FIG. 1, a high-pressure container 10 according to the present embodiment has a filling space 12 for compressing and storing gas. The high-pressure container 10 is applied to, for example, a fuel cell system. The filling space 12 of the high-pressure container 10 stores a fuel gas such as hydrogen gas or methane gas. The high-pressure container 10 is mounted on, for example, a fuel cell vehicle (not shown) and stores fuel gas supplied from a gas station. The high-pressure container 10 supplies fuel gas to a fuel cell stack (not shown) when the vehicle is running or the like. Moreover, the high-pressure container 10 is not limited to being applied to the fuel cell system, and is capable of storing a gas other than hydrogen gas.

The high-pressure container 10 includes a cylindrical body portion 16 and hemispherical closing portions 18 that close both ends of the body portion 16. The diameter and length of the body portion 16 are set according to a volume required for the filling space 12. The closing portion 18 on one end side of the high-pressure container 10 and the closing portion 18 on the other end side each have a port portion 20. The port portion 20 is a member that communicates between the outside of the high-pressure container 10 and the filling space 12. For example, a connection member such as a pipe or a valve is connected to the port portion 20, whereby the high-pressure container is connected to an external device such as a fuel cell system.

The high-pressure container 10 has a liner 22 containing the filling space 12 thereinside and also has a fiber layer 24 covering the outer surface of the liner 22. The liner 22 constitutes an inner layer (skeletal structure) of the high-pressure container 10. The body portion 16 of the liner 22 extends linearly in the axial direction. On the other hand, each closing portion 18 of the liner 22 is smoothly curved in a hemispherical shape from the connection portion with the body portion 16 toward the inner side in the radial direction and is thus reduced in diameter. The body portion 16 and the closing portions 18 of the liner 22 are integrally formed of a resin material (for example, polyamide-based resin). The port portion 20 is attached to each closing portion 18 of the liner 22. The port portion 20 includes a penetrating portion 20a that extends in the axial direction of the liner 22 and penetrates the closing portion 18 of the liner 22, and a flange-shaped joint portion 20b joined to the closing portion 18 of the liner 22. An axial hole 20c communicating with the filling space 12 is formed in the penetrating portion 20a.

The fiber layer 24 is directly laminated onto an outer periphery 32 (see FIG. 2) of the liner 22. The fiber layer 24 covers the entire liner 22 to form an outer layer of the high-pressure container 10. The fiber layer 24 is formed by winding reinforcing fibers 34 (see FIG. 2) around the liner 22 by a filament winding process. As the reinforcing fibers 34, a fiber-reinforced resin obtained by impregnating a fiber bundle made up of a bundle of filaments 35 (see FIG. 2) (for example, carbon fibers) with a thermosetting resin is used. The filaments 35 constituting the reinforcing fibers 34 are not limited to carbon fibers. As the reinforcing fibers 34, for example, one or more of glass fiber, basalt fiber, iron-based fiber such as stainless steel, fiber of copper, silver, or gold alloy, shape memory alloy-based fiber, polypropylene fiber, polyamide fiber, and hemp, silk, cotton, or bamboo fiber can be used.

Figure 2:
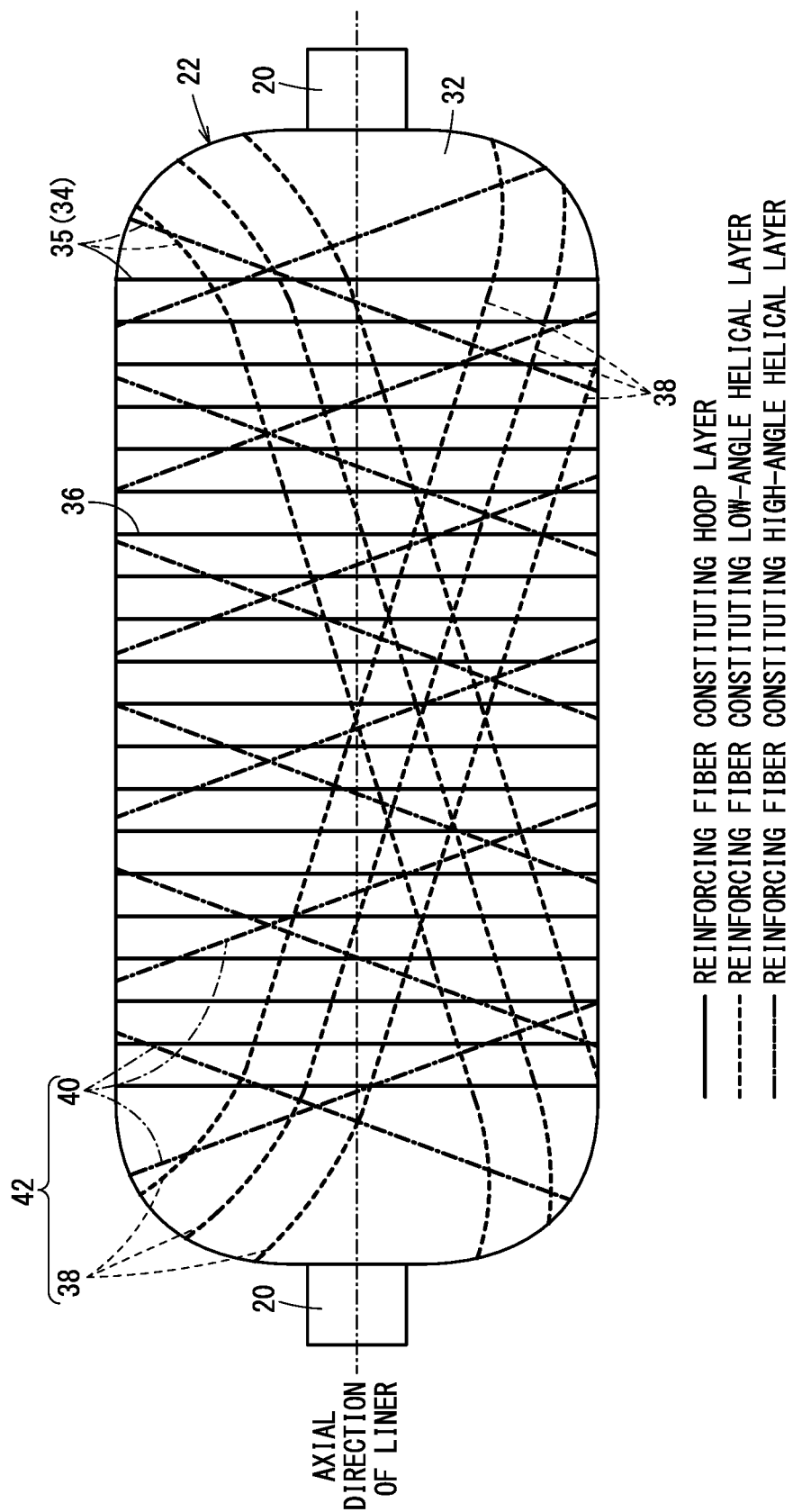
FIG. 2 is an explanatory view of a hoop layer, a low-angle helical layer, and a high-angle helical layer included in a fiber layer of FIG. 1.

As shown in FIG. 2, the fiber layer 24 includes a hoop layer 36, a low-angle helical layer 38, and a high-angle helical layer 40. The hoop layer 36 is a layer formed by winding the reinforcing fiber 34 in a circumferential direction substantially perpendicular to the axial direction of the liner 22. The hoop layer 36 is disposed on the outer periphery 32 of the body portion 16 of the liner 22. The hoop layer 36 reinforces the body portion 16 of the liner 22. The low-angle helical layer 38 and the high-angle helical layer 40 are layers formed by helical winding in which the reinforcing fiber 34 is wound at an angle with respect to the axial direction of the liner 22. In this specification, the low-angle helical layer 38 and the high-angle helical layer 40 may be collectively referred to as a helical layer 42. The helical layer 42 reinforces the closing portions 18.

The low-angle helical layer 38 is a helical layer 42 having a small inclination angle $\alpha$ with respect to the axial direction of the liner 22. The low-angle helical layer 38 is mainly wound around the outer periphery of the closing portions 18 of the liner 22. The low-angle helical layer 38 is thickly wound around the liner 22 in the vicinity of the port portion 20 and reinforces the liner 22 in the vicinity of the port portion 20.

The high-angle helical layer 40 is a helical layer 42 having a large inclination angle $\alpha$ with respect to the axial direction of the liner 22. The high-angle helical layer 40 covers the body portion 16 of the liner 22, portions of the closing portions 18, and the body portion 16. The high-angle helical layer 40 reinforces portions of the closing portions 18 that are located near the body portion 16.

In the fiber layer 24, the hoop layer 36, the low-angle helical layer 38, and the high-angle helical layer 40 are laminated in a plurality of layers in a predetermined order from the inner peripheral side. Therefore, as shown in FIG. 3, in the cross section of the fiber layer 24, the plurality of hoop layers 36 are sandwiched between the helical layers 42.

Figure 3:
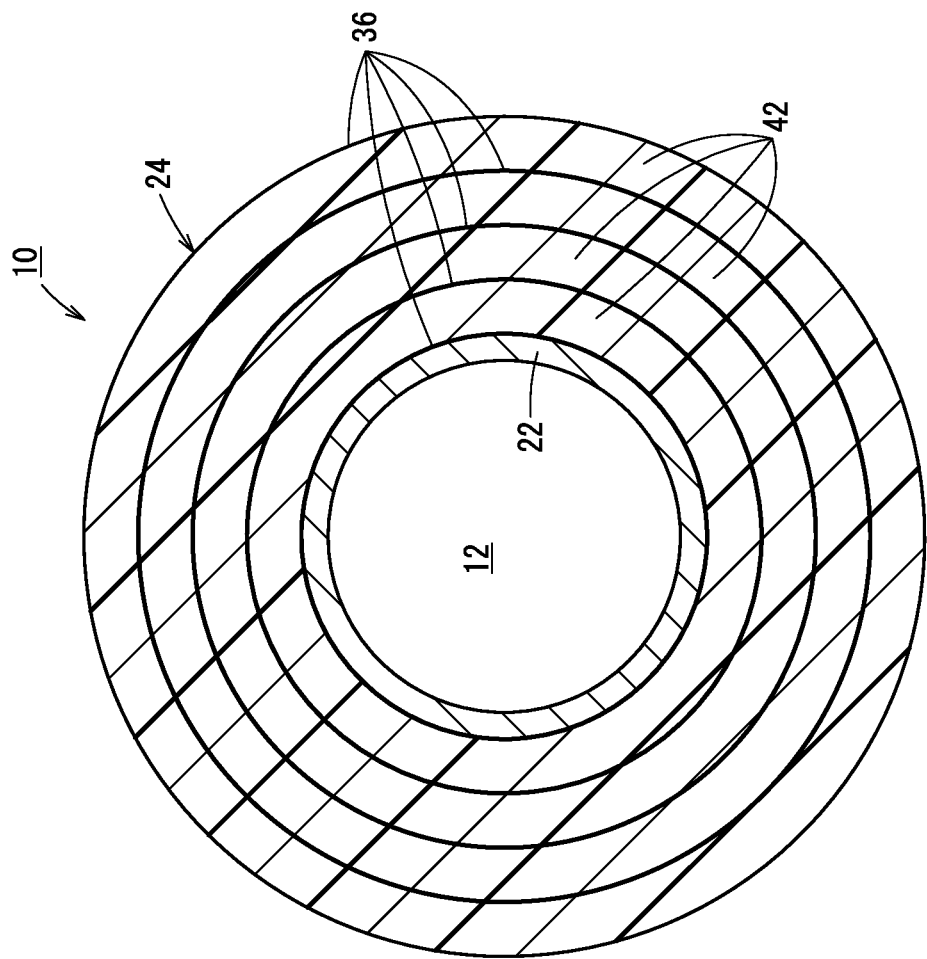
FIG. 3 is a cross-sectional view of the fiber layer of the high-pressure container of FIG. 1.

As shown in FIG. 3, when the filling space 12 of the high-pressure container 10 is filled with a high-pressure gas, an internal pressure acts on the liner 22. The body portion 16 which occupies most of the high-pressure container 10 is focused on below. An internal pressure that tends to expand the liner 22 and the fiber layer 24 outward in the circumferential direction acts on the body portion 16. The internal pressure is transmitted to the plurality of hoop layers 36 through the liner 22. As a result, the fiber layer 24 is deformed such that the radius thereof increases. As a result of the increase in the radius of the fiber layer 24, a tensile stress to stretch the reinforcing fibers 34 in the circumferential direction acts on the reinforcing fibers 34 constituting the plurality of hoop layers 36. The tensile stress acting on the reinforcing fibers 34 causes deformation (strain) that stretches the hoop layer 36 in the circumferential direction. The magnitude of the strain generated in the plurality of hoop layers 36 stacked in the radial direction varies depending on the position in the radial direction.

Hereinafter, deformation of the fiber layer 24 and strain of the plurality of hoop layers 36 will be described with reference to FIG. 4. The illustrated inner strip-shaped circular arc 44 schematically shows the fiber layer 24 in a state in which no internal pressure acts. The radius of the inner peripheral side of the fiber layer 24 is defined as $r_0$, the radius of the outer peripheral side of the fiber layer 24 is defined as $r_1$, and the thickness of the fiber layer 24 is defined as d. The radius $r_1$ on the outer peripheral side is expressed as $r_1=r_0+d$.

Figure 4:
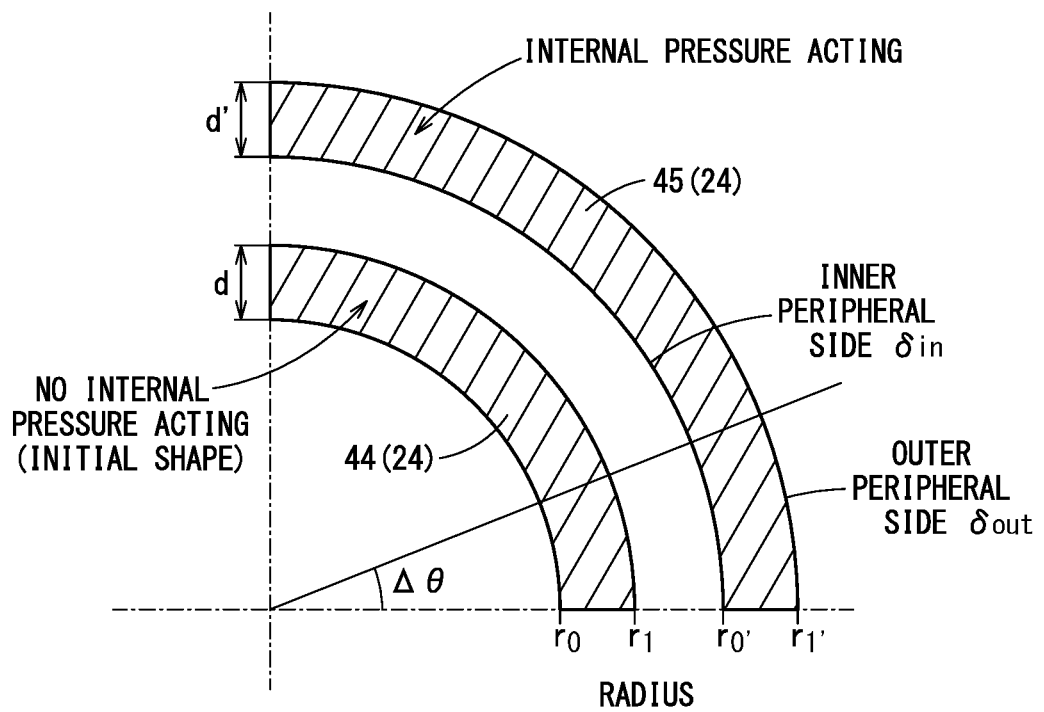
FIG. 4 is an explanatory view showing deformation (strain) of the fiber layer when internal pressure acts on the high-pressure container shown in FIG. 1.

When the internal pressure acts on the high-pressure container 10, as shown by an outer strip-shaped circular arc 45 in FIG. 4, the radius of the inner peripheral side of the fiber layer 24 expands to $r_0'$, the radius of the outer peripheral side of the fiber layer 24 expands to $r_1'$, and the fiber layer 24 elongates by an angle $\Delta\theta$ in the circumferential direction. At this time, since the volume (or Poisson's ratio) of the fiber layer 24 is constant, the thickness d' of the fiber layer 24 decreases in accordance with the amount by which the fiber layer 24 elongates in the circumferential direction. The thickness d' of the fiber layer 24 under the action of the internal pressure becomes thinner than the thickness d in a state where no internal pressure acts. That is, the condition of d'−d<0 is satisfied.

Here, the strain (elongation in the circumferential direction) $\delta_{in}$ of the inner peripheral portion of the fiber layer 24 on which the internal pressure acts is expressed as $\delta_{in}=(\frac{1}{2})\Delta\theta(r_0'-r_0)$. Further, the strain (elongation in the circumferential direction) $\delta_{out}$ of the outer peripheral portion of the fiber layer 24 on which the internal pressure acts is expressed as $\delta_{out}=(\frac{1}{2})\Delta\theta(r_1'-r_1)$. A difference $\delta_{out}-\delta_{in}$ between the strain $\delta_{in}$ of the inner peripheral portion and the strain $\delta_{out}$ of the outer peripheral portion satisfies the following condition.

$$\delta_{out}-\delta_{in}=(\frac{1}{2})\Delta\theta(r_0'-r_0+d'-d-(r_0'-r_0))=(\frac{1}{2})\Delta\theta(d'-d)<0$$

As shown in the above equation, in the fiber layer 24, the strain $\delta_{in}$ of the inner peripheral portion is larger than the strain $\delta_{out}$ of the outer peripheral portion.

Figure 5:
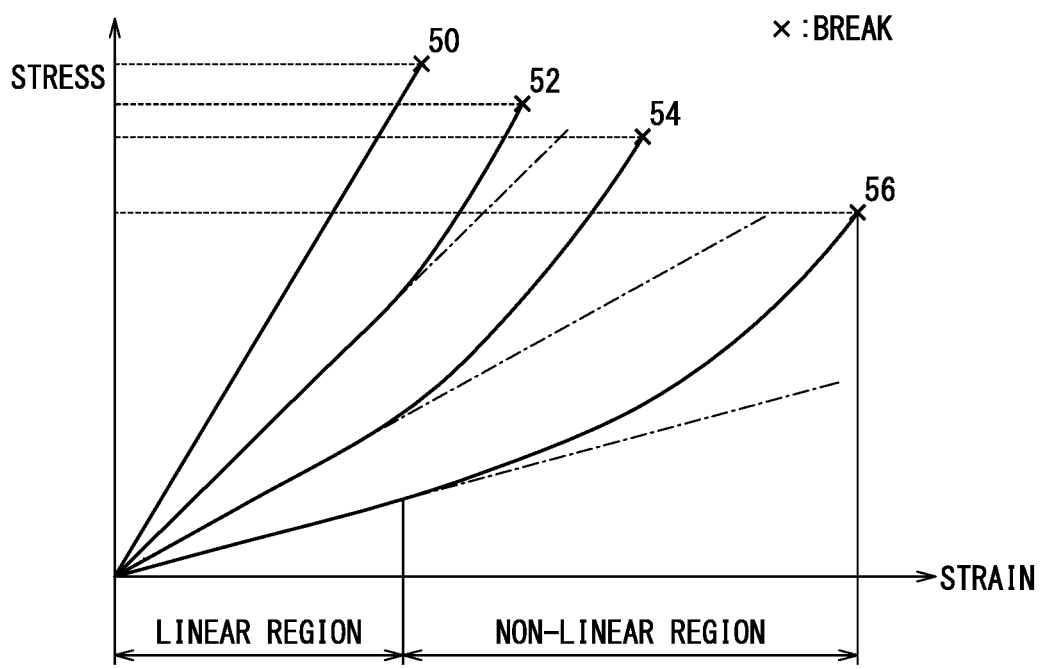
FIG. 5 is a graph showing a twist angle of a reinforcing fiber and the characteristics of the reinforcing fiber.

As shown in FIG. 5, the stress-strain characteristic of the reinforcing fiber 34 exhibits a change represented by a line denoted by reference numeral 50. As the strain of the reinforcing fiber 34 increases, the stress also increases linearly. When the strain further increases and the stress reaches a predetermined value, the reinforcing fiber 34 is broken. Here, as described above with reference to FIG. 4, in the fiber layer 24, a larger strain occurs at the hoop layer 36 that is located closer to the inner periphery. Therefore, when all the hoop layers 36 are formed of the reinforcing fibers 34 having the same stress-strain characteristics, the stress is concentrated on the hoop layer 36 that is located in the inner peripheral portion where a larger strain occurs. As a result, in such a high-pressure container 10, the maximum pressure is reached before the stress occurring at the hoop layer 36 on the outer peripheral side reaches the limit, and fracture of the hoop layer 36 on the inner layer side starts.

In view of the above, in the present embodiment, the reinforcing fiber 34 that greatly elongates before breaking is used for the hoop layer 36 that is the first layer from the inner peripheral side on which the largest strain acts.

Figure 6A:
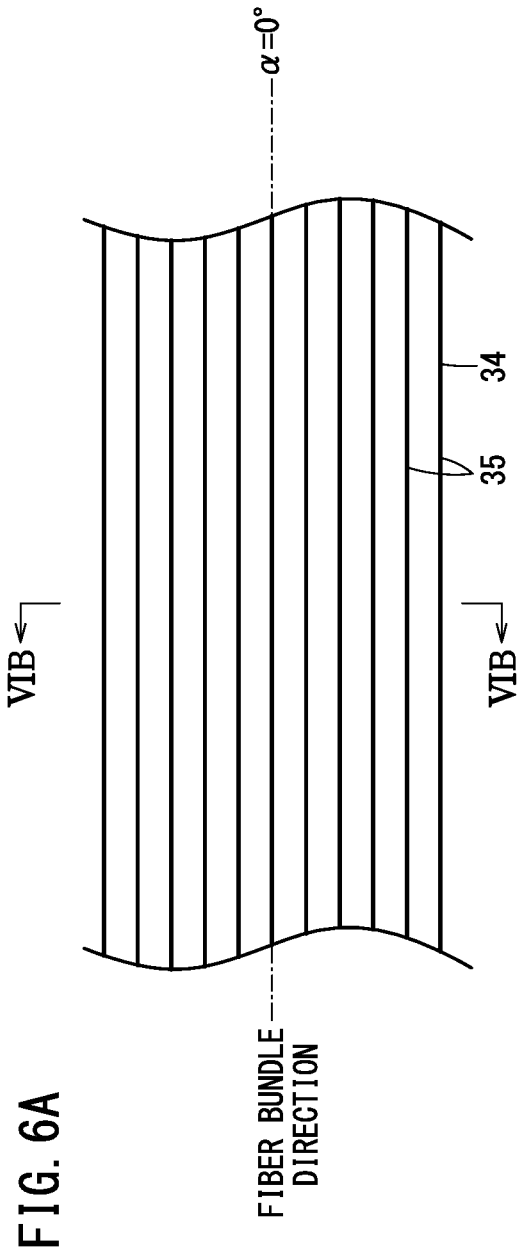
FIG. 6A is a diagram of a reinforcing fiber in which filaments and a fiber bundle direction are oriented in the same direction.
Figure 6B:
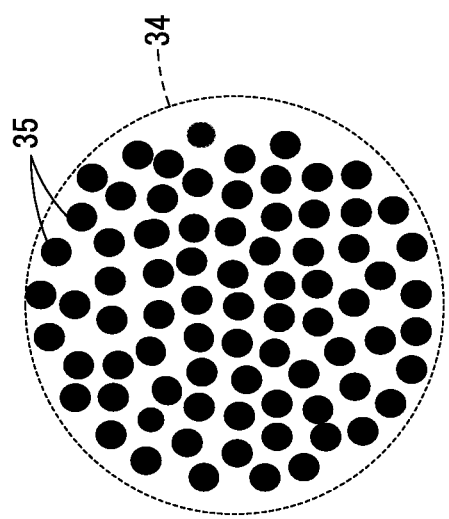
FIG. 6B is a cross-sectional view of the reinforcing fiber of FIG. 6A taken along line VIB-VIB.

In FIG. 5, lines denoted by reference numerals 50, 52, 54, and 56 indicate stress-strain characteristics of the reinforcing fibers 34 having different twist angles when carbon fibers are used as the filaments 35. The line denoted by reference numeral 50 represents the stress-strain characteristics of the reinforcing fiber 34 shown in FIG. 6A. In the reinforcing fiber 34 in FIG. 6A, the filaments 35 are not twisted, and an inclination angle α (also referred to as a twist angle) formed between the filaments 35 and the fiber bundle direction is approximately 0°. Since it is actually difficult to manufacture a fiber bundle having an inclination angle α of exactly 0°, the inclination angle α of the filament 35 is actually slightly inclined with respect to 0°. As shown in FIG. 6B, all the filaments 35 maintain the original circular cross-sectional shape in the cross-section of the reinforcing fiber 34 having an inclination angle α of about 0°.

As shown in FIG. 5, in the reinforcing fiber 34 in which the inclination angle α of the filaments 35 is 0°, the stress value linearly increases with increasing strain, and the reinforcing fiber 34 breaks at a predetermined strain. The reinforcing fiber 34 having the inclination angle α of 0° has a larger Young's modulus (slope of the line denoted by reference numeral 50) and a larger stress value (tensile strength) at the time of breakage than the twisted reinforcing fibers 34 (reference numerals 52, 54, and 56). That is, the reinforcing fiber 34 having the inclination angle α of 0° is excellent in strength.

Figure 7A:
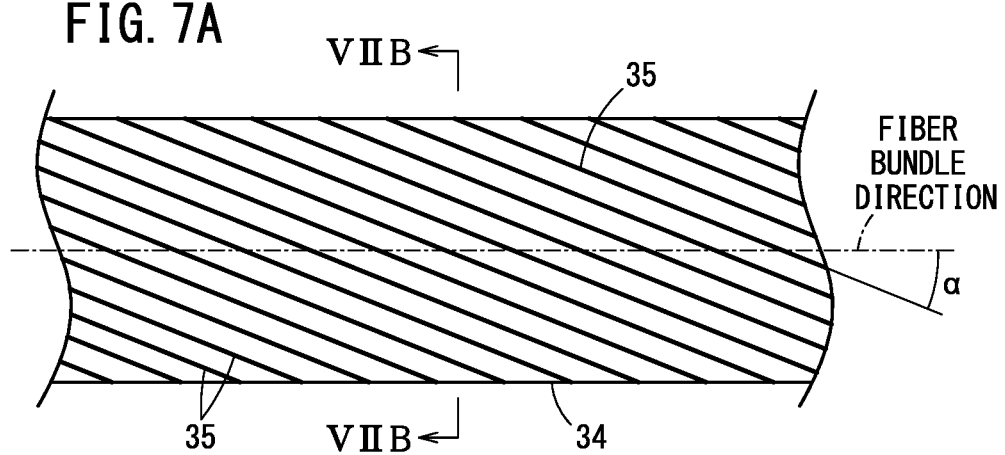
FIG. 7A is a diagram of a reinforcing fiber in which filaments are twisted.
Figure 7B:
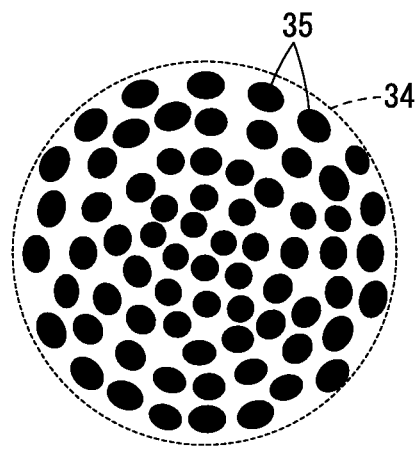
FIG. 7B is a cross-sectional view of the reinforcing fiber of FIG. 7A taken along line VIIB-VIIB.
Figure 7C:
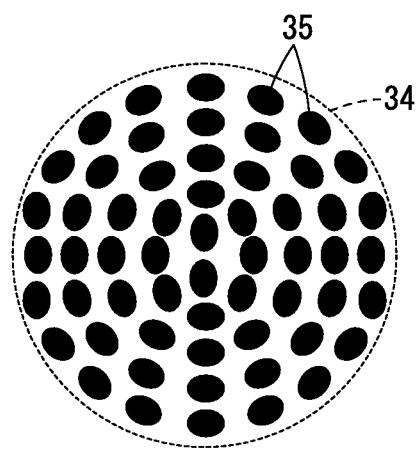
FIG. 7C is a cross-sectional view of a more effectively twisted reinforcing fiber according to a modification of the reinforcing fiber of FIG. 7B.
Figure 7D:
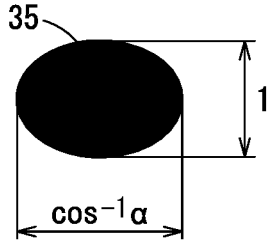
FIG. 7D is a cross-sectional view of the filament of FIG. 7A.

On the other hand, the lines denoted by reference numerals 52, 54, and 56 indicate the stress-strain characteristics of the reinforcing fibers 34 obtained by twisting the filaments 35. As shown in FIG. 7A, in the reinforcing fiber 34 in which the filaments 35 are twisted, the filaments 35 are inclined at a predetermined inclination angle α with respect to the fiber bundle direction of the reinforcing fiber 34. As shown in FIG. 7B, in the reinforcing fiber 34 in which the filaments 35 are twisted, the cross-sectional shape of some of the filaments 35 is deformed to be flat. The cross section of the filaments 35 near the outside of the reinforcing fiber 34 is flattened more than the cross section of the filaments 35 near the center of the reinforcing fiber 34. Further, in a state in which the reinforcing fibers 34 are twisted so as to further exhibit the effect of the present invention, the inclination angles α of the filaments 35 become substantially the same angle, and this state is shown in FIG. 7C. In the example shown in FIG. 7C, in the cross section of the reinforcing fiber 34, all the filaments 35 have an elliptical shape having substantially the same cross-sectional shape regardless of the position. As shown in FIG. 7D, in the reinforcing fiber 34 having the inclination angle α of the filaments 35, the outermost filament 35 has an elliptical shape in which the length of the major axis direction is $\cos^{-1}\alpha$ when the length of the minor axis direction is defined as 1.

In FIG. 5, the inclination angle α (twist angle) of the filaments 35 of the reinforcing fiber 34 increases in the order of reference numerals 52, 54, and 56. In the twisted reinforcing fiber 34, in a range in which the strain is small, an increase rate of the stress with respect to the strain becomes gentler as the inclination angle α of the reinforcing fiber 34 becomes larger. Therefore, the reinforcing fiber 34 having a large inclination angle α elongates more greatly with respect to the same strain. The twisted reinforcing fiber 34 has a non-linear region in which the Young's modulus increases and the stress changes nonlinearly at a strain of a predetermined value or more. In the non-linear region, the Young's modulus of the reinforcing fiber 34 increases until just before breaking. The larger the inclination angle α of the reinforcing fiber 34 is, the larger the nonlinear region is.

Therefore, in the present embodiment, the reinforcing fiber 34 obtained by twisting the filaments 35 so as to be inclined with respect to the fiber bundle direction is used in the first hoop layer 36, which is the first layer from the inner side in FIG. 3. In this way, by using the twisted reinforcing fiber 34 in the first hoop layer 36, i.e., the innermost hoop layer, it is possible to prevent tensile stress from concentrating on the reinforcing fiber 34 constituting the first hoop layer 36. The tensile stress acting on the first hoop layer 36 decreases, and accordingly the reinforcing fibers 34 of the other hoop layers 36 on the more outer peripheral side are subjected to tensile stress. Therefore, according to the high-pressure container 10 of the present embodiment, the performance of the reinforcing fibers 34 of the hoop layers 36 on the outer peripheral side can be effectively utilized.

Hereinafter, a method for manufacturing the high-pressure container 10 of the present embodiment will be described.

Figure 8:
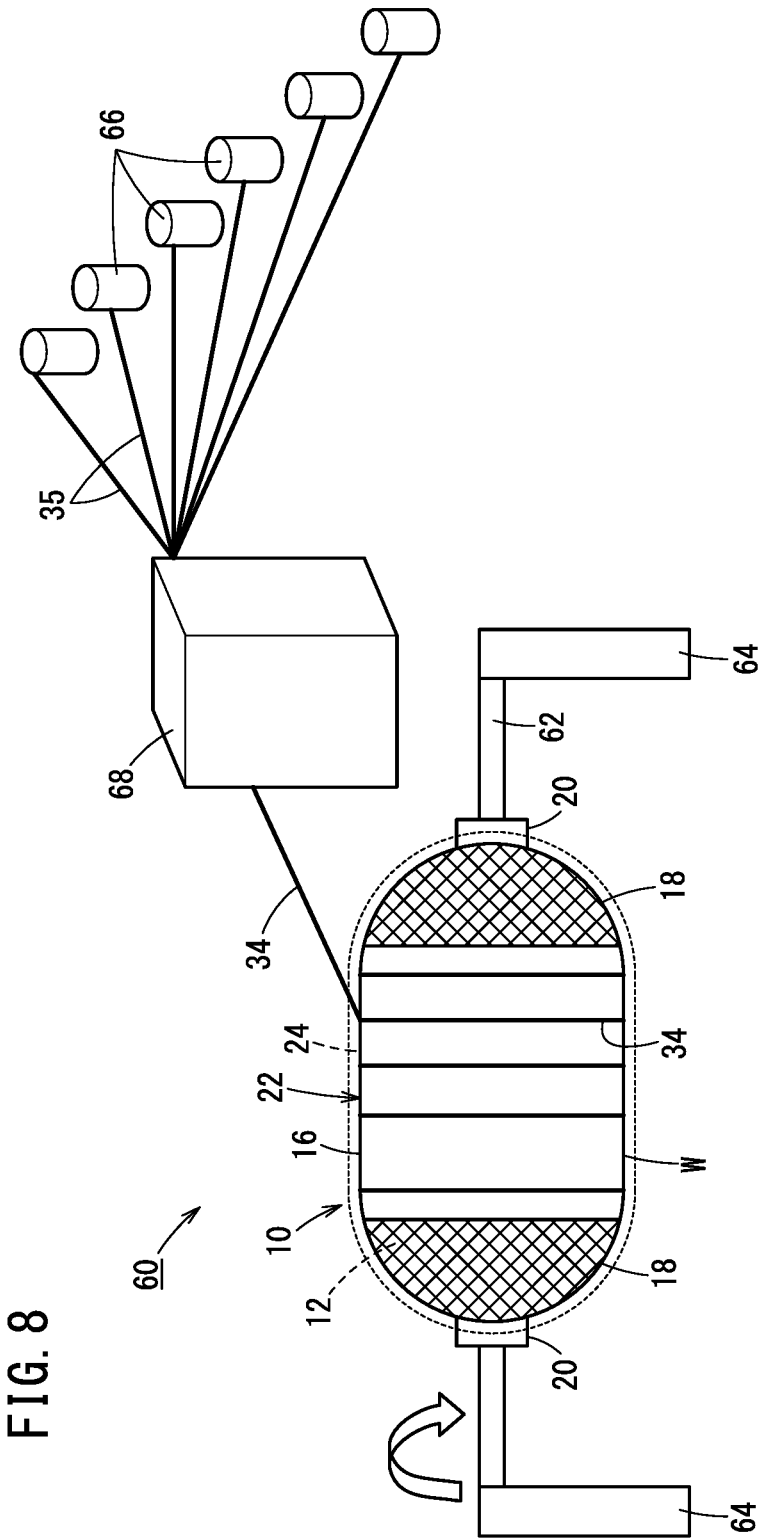
FIG. 8 is a schematic view of processing equipment for the high-pressure container according to a first embodiment.

As shown in FIG. 8, first, a workpiece W to which a filament winding method is applied is prepared. The workpiece W is a workpiece in which the port portions 20 are attached to one end and the other end of the liner 22. Next, the fiber layer 24 is formed by performing a filament winding process in which the reinforcing fibers 34 are wound around the outer surface of the workpiece W.

The filament winding process is performed using processing equipment 60 shown in FIG. 8. A shaft 62 is inserted into the workpiece W so as to pass through the port portion 20. One end and the other end of the shaft 62 are attached to a rotation mechanism 64. The rotation mechanism 64 rotates the workpiece W about the shaft 62. Next, the reinforcing fiber 34 is wound around the outer peripheral portion of the rotating workpiece W. The reinforcing fibers 34 are produced by bundling filaments 35 reeled out from a plurality of creels 66. The filaments 35 fed from the creels 66 are bundled into a fiber bundle in a processing unit 68. The processing unit 68 can adjust the twist angle (inclination angle α) of the filaments 35. The fiber bundle is impregnated with a base material resin in an impregnation part inside the processing unit 68. The processing equipment 60 winds the reinforcing fiber 34 around the rotating workpiece W while moving the processing unit 68. The hoop layer 36, the low-angle helical layer 38, and the high-angle helical layer 40 are formed by the processing unit 68 moving in a movement pattern.

Figure 10A:
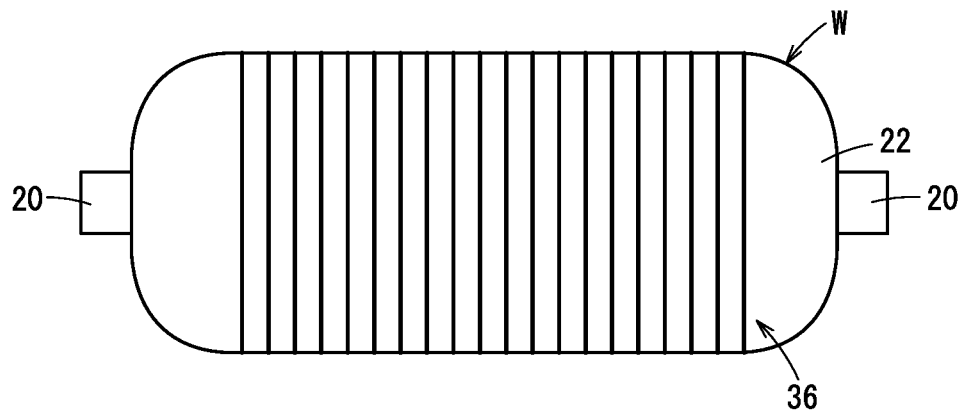
FIG. 10A is an explanatory view showing a hoop layer forming step.

In the present embodiment, the fiber layer 24 is formed in the order shown in FIG. 9. First, in step S10, the processing equipment 60 forms the first hoop layer 36 (see FIG. 10A) which is the first layer from the innermost peripheral side. When forming the first hoop layer 36, the processing unit 68 (see FIG. 8) twists the plurality of filaments 35 at a predetermined inclination angle α to form the reinforcing fiber 34.

Figure 10B:
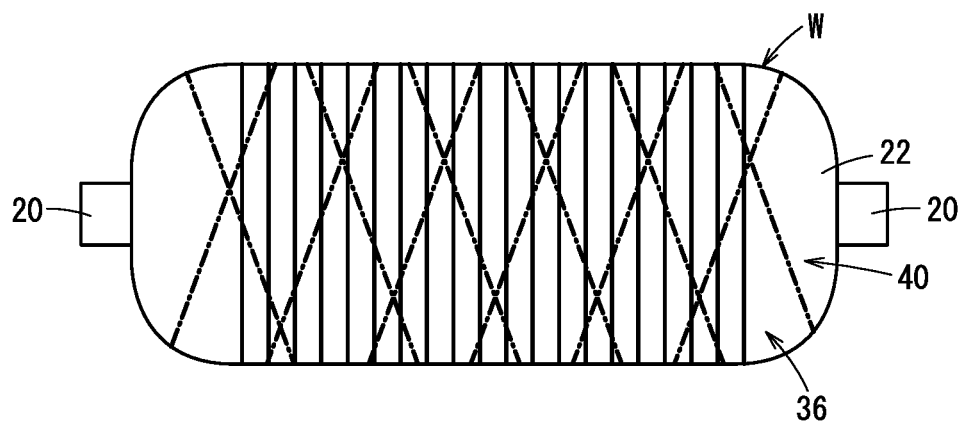
FIG. 10B is an explanatory view showing a high-angle helical layer forming step.

Next, in step S20, the processing equipment 60 forms the high-angle helical layer 40 (see FIG. 10B) on the first hoop layer 36. When forming the high-angle helical layer 40, the processing unit 68 bundles fiber bundles without twisting the plurality of filaments 35, to produce the reinforcing fiber 34.

Figure 10C:
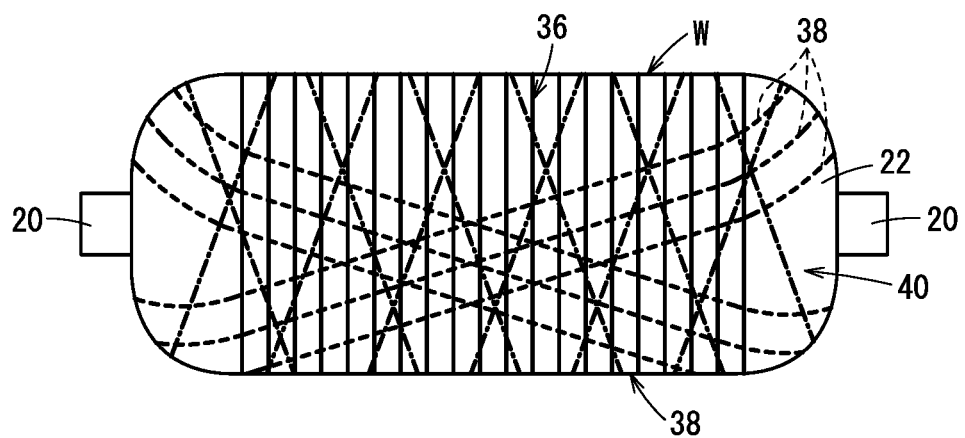
FIG. 10C is an explanatory view showing a low-angle helical layer forming step.

Next, in step S30, the processing equipment 60 forms the low-angle helical layer 38 (see FIG. 10C) on the high-angle helical layer 40. When forming the low-angle helical layer 38, the processing unit 68 bundles fiber bundles without twisting the filaments 35, to produce the reinforcing fiber 34.

Next, in step S40, the processing equipment 60 forms the high-angle helical layer 40 on the low-angle helical layer 38. Also in step S40, the processing unit 68 produces the reinforcing fiber 34 without twisting the plurality of filaments 35.

Next, in step S50, the processing equipment 60 determines whether or not a predetermined number of laminated layers has been reached. When the number of laminated layers is insufficient (NO), steps S10, S20, S30, and S40 are repeated to laminate the hoop layer 36, the low-angle helical layer 38, and the high-angle helical layer 40. In the present embodiment, the hoop layers 36 of the second and subsequent layers from the inner peripheral side are formed by using the reinforcing fibers 34 produced without twisting the filaments 35.

On the other hand, in step S50, when the predetermined number of laminated layers has been reached (YES), the processing equipment 60 advances the process to step S60.

In step S60, the processing equipment 60 forms the hoop layer 36 that is the outermost layer of the fiber layer 24. By the above process, the fiber layer 24 of the present embodiment is completed. According to the above-described manufacturing method, since the inner periphery and the outer periphery of the fiber layer 24 are constituted by the hoop layers 36, the high-pressure container 10 which is excellent in strength of the body portion 16 is obtained.

Second Embodiment

In the high-pressure container 10 of the present embodiment, the reinforcing fibers 34 formed by twisting the filaments 35 are used for a plurality of hoop layers 36 that are arranged on the inner peripheral side, among the plurality of hoop layers 36. In this case, for the hoop layer 36, which is located closer to the inner peripheral side, the reinforcing fiber 34 with a larger inclination angle α of filaments 35 is used. That is, as the hoop layer 36 gets closer to the inner peripheral side, the twist angle of the filaments 35 in the reinforcing fibers 34 used for the hoop layer becomes larger.

As shown in FIG. 5, the larger the inclination angle α of the filaments 35 of the reinforcing fiber 34 is, the more easily the reinforcing fiber 34 elongates. Therefore, according to the high-pressure container 10 of the present embodiment, the reinforcing fibers 34 having stress-strain characteristics suitable for the magnitude of strain can be used in accordance with the position of the hoop layer 36 in the radial direction. Therefore, according to the high-pressure container 10 of the present embodiment, the performance of the high-strength reinforcing fibers 34 included in the hoop layer 36 on the outer peripheral side can be utilized, and the fiber layer 24 can be thinned. As a result, the amount of the reinforcing fibers 34 required for manufacturing the high-pressure container 10 can be reduced, so that the manufacturing cost can be reduced.

Third Embodiment

As shown in FIG. 11, the manufacturing process of the fiber layer 24 of this embodiment is different from the manufacturing process of the fiber layer 24 shown in FIG. 9. In the manufacturing process of the present embodiment, in step S110, the processing equipment 60 (see FIG. 8) performs a low-angle helical layer forming step. As a result, the low-angle helical layer 38 is formed on the innermost periphery of the fiber layer 24.

Next, the process proceeds to step S120, and the processing equipment 60 forms the hoop layer 36 on the low-angle helical layer 38. In the processing equipment 60, the hoop layer 36 on the inner peripheral side is formed using the reinforcing fiber 34 in which the filaments 35 are twisted at a predetermined inclination angle α as illustrated in FIG. 7A.

Next, in step S130, the processing equipment 60 forms the high-angle helical layer 40. Thereafter, in step S140, the processing equipment 60 forms the low-angle helical layer 38. Thereafter, in step S150, the processing equipment 60 forms the high-angle helical layer 40.

Next, in step S160, when the processing equipment 60 determines that a predetermined number of laminated layers has not been reached (NO), steps S120 to S150 are repeated. The processing equipment 60 decreases the inclination angle α of the filaments 35 of the reinforcing fiber 34 every time the number of laminated hoop layers 36 increases.

In step S160, when the processing equipment 60 determines that the predetermined number of laminated layers has been reached (YES), the process proceeds to step S170. In step S170, the processing equipment 60 forms the hoop layer 36. In step S170, the processing unit 68 (see FIG. 8) bundles the fiber bundles without twisting the filaments 35, to produce the reinforcing fibers 34.

According to the present embodiment, it is possible to obtain the high-pressure container 10 in which the strength of the body portion 16 and also the strength of the closing portions 18 are excellent.

Fourth Embodiment

In the high-pressure container 10 of the present embodiment, tension when the twisted reinforcing fibers 34 are wound around the workpiece W (see FIG. 8) is changed according to the position of the hoop layer 36. Concerning the first hoop layer 36, which is the first layer from the inner periphery, the reinforcing fiber 34 is wound with a first tension which is relatively small. The second hoop layer 36 which is the second layer from the inner periphery is formed by winding the reinforcing fiber 34 with a second tension larger than the first tension. Further, the tension with which the reinforcing fiber 34 is wound is increased as the hoop layer 36 is located farther away from the inner periphery. As described above, in the high-pressure container 10 of the present embodiment, not only the twist angle of the reinforcing fibers 34 constituting the hoop layer 36 but also the initial stress is added. In the high-pressure container 10 of the present embodiment, since the reinforcing fibers 34 having optimal characteristics according to the position of the hoop layer 36 are used, the performance of the reinforcing fibers 34 can be utilized.

Fifth Embodiment

Figure 12A:
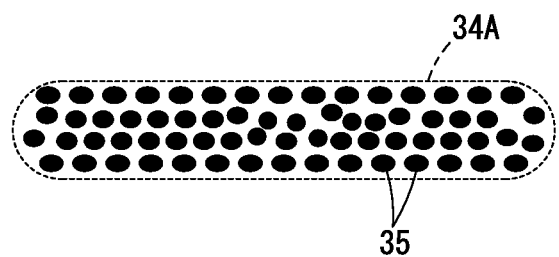
FIG. 12A is a cross-sectional view of a reinforcing fiber according to a fifth embodiment.
Figure 12B:
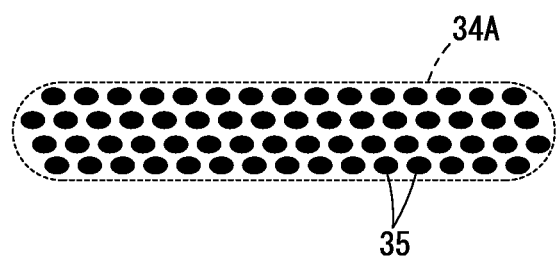
FIG. 12B is a cross-sectional view of a reinforcing fiber according to a modification of FIG. 12A.

In the high-pressure container 10 of the present embodiment, as shown in FIG. 12A, the hoop layer 36 has a reinforcing fiber 34A made of spread tow. The reinforcing fiber 34A is formed by the following method. First, filaments 35 made of a resin serving as a precursor of carbon fibers are spun to form a fiber bundle, which is then fired to form carbon fibers. This fiber bundle is twisted at the stage of spinning the filaments 35. The filaments 35 are inclined at a predetermined inclination angle α with respect to the fiber bundle direction. The inclination angle α of the filaments 35 is maintained even after the filaments have been formed into the carbon fiber. Thereafter, before the reinforcing fiber 34A is placed in the high-pressure container, the twisted carbon fibers are subjected to spreading (opening) for thinning and pressing the fibers into a flattened shape, thereby obtaining the reinforcing fiber 34A. In the reinforcing fiber 34A, the filaments 35 are inclined at an inclination angle α with respect to the reinforcing fiber 34A. The reinforcing fiber 34A has nonlinear characteristics similar to those of the reinforcing fibers 34 shown in FIGS. 7A to 7D. Similarly, in a state in which the reinforcing fiber 34A is twisted so as to further exhibit the effect of the present invention, the inclination angles α of the filaments 35 become substantially the same angle, and this state is shown in FIG. 12B. In the reinforcing fiber 34A shown in FIG. 12B, the filaments 35 have an elliptical shape of substantially the same shape regardless of the position.

In the high-pressure container 10 of the present embodiment, the twisted reinforcing fibers 34A are used for the first hoop layer 36 from the inner periphery or for the first hoop layer 36 and one or more hoop layers 36 subsequent to the first hoop layer.

Hereinafter, effects of the above-described embodiments will be described.

A high-pressure container 10 includes: a liner 22 including a cylindrical body portion 16 and hemispherical closing portions 18 configured to close one end and another end of the body portion respectively; and a fiber layer 24 made up of reinforcing fibers 34 wound around an outer periphery of the liner. The fiber layer includes: a plurality of hoop layers 36 in which the reinforcing fibers are wound in a circumferential direction of the liner in order to reinforce the body portion; and a plurality of helical layers 42 in which the reinforcing fibers are wound so as to be inclined with respect to an axial direction of the liner in order to reinforce the closing portions, and the reinforcing fibers used for a first hoop layer from an inner peripheral side of the fiber layer or for the first hoop layer and one or more hoop layers subsequent to the first hoop layer, among the plurality of hoop layers, have a structure in which a plurality of filaments 35 are twisted so as to be inclined with respect to a fiber bundle direction, and have a property of more easily elongating than the reinforcing fibers used for the hoop layer that is located on an outer peripheral side of the fiber layer.

According to the above configuration, it is possible to prevent tensile stress from concentrating on the hoop layer in the vicinity of the inner periphery that tends to be subjected to a large strain under the action of the internal pressure, and it is possible to utilize the performance of the reinforcing fibers in the vicinity of the outer periphery. Thus, the fiber layer can be thinned. In addition, since the usage amount of reinforcing fibers can be reduced, the manufacturing cost can be reduced.

In the high-pressure container, when the reinforcing fibers are used for the hoop layers, as the hoop layer gets closer to the inner peripheral side, a twist angle of the reinforcing fiber used for the hoop layer becomes larger, the twist angle being an angle formed between the fiber bundle direction of the reinforcing fiber and the filaments. According to this configuration, since the reinforcing fiber which easily elongates is applied to the inner periphery which tends to be subjected to a large strain and the reinforcing fiber which is excellent in strength is applied to the outer periphery which tends to be subjected to a small strain, it is possible to further reduce the thickness of the fiber layer 24.

In the high-pressure container described above, each of the hoop layers may be sandwiched between the helical layers.

In the high-pressure container, the innermost layer in the fiber layer may be the hoop layer. According to this configuration, the strength of the body portion of the high-pressure container is improved.

In the above-described high-pressure container, the filaments constituting the hoop layer that is located closer to the inner peripheral side may be formed to be flatter in cross section. As the twist angle increases, the filaments are further compressed and deformed into a flatter shape. Therefore, in the high-pressure container, the filaments of the hoop layer closer to the inner peripheral side become flatter by reflecting the twist angle.

According to the present embodiments, there is provided a method of manufacturing a high-pressure container in which a fiber layer is formed by winding reinforcing fibers around a liner including a cylindrical body portion and hemispherical closing portions that close one end and another end of the body portion respectively, the method including a fiber layer forming step of forming the fiber layer by repeating steps a plurality of times, the steps including: a reinforcing fiber forming step of forming the reinforcing fibers by bundling a plurality of filaments; a hoop layer forming step of forming a hoop layer by winding the reinforcing fiber in a circumferential direction of the body portion of the liner; and a helical layer forming step of forming a helical layer that reinforces the closing portions, by winding the reinforcing fiber in a direction inclined with respect to an axial direction of the liner while forming the reinforcing fiber by bundling the plurality of filaments; wherein the reinforcing fibers used for a first hoop layer from an inner peripheral side of the fiber layer or for the first hoop layer and one or more hoop layers subsequent to the first hoop layer, among the plurality of hoop layers, are formed by twisting the plurality of filaments so as to be inclined with respect to a fiber bundle direction, in the reinforcing fiber forming step, and thereby have a property of more easily elongating than the reinforcing fibers used for the hoop layer that is located on an outer peripheral side of the fiber layer.

According to the method of manufacturing the high-pressure container described above, the strength of the reinforcing fibers included in the hoop layer on the outer peripheral side can be utilized, and the thickness of the fiber layer can be reduced. As a result, the amount of reinforcing fibers used in the fiber layer can be reduced, and the manufacturing cost can be reduced.

In the above-described method of manufacturing the high-pressure container, in the reinforcing fiber forming step, when the reinforcing fibers are used for the hoop layers, as the hoop layer gets closer to the inner peripheral side, a twist angle with which the filaments are twisted to form the reinforcing fiber for the hoop layer becomes larger, the twist angle being an angle formed between the fiber bundle direction of the reinforcing fiber and the filaments.

The present invention is not limited to the above-described embodiments, and various configurations can be adopted therein without departing from the essence and gist of the present invention.

What is claimed is:

1. A high-pressure container comprising a liner including a cylindrical body portion and hemispherical closing portions configured to close one end and another end of the body portion respectively, and a fiber layer comprising reinforcing fibers wound around an outer periphery of the liner,
    wherein the fiber layer comprises:
    at least two hoop layers in which the reinforcing fibers are wound in a circumferential direction of the liner in order to reinforce the body portion; and
    a plurality of helical layers in which the reinforcing fibers are wound so as to be inclined with respect to an axial direction of the liner in order to reinforce the closing portions, and
    wherein the reinforcing fibers used for at least one of the at least two hoop layers have a structure in which a plurality of filaments are twisted so as to be inclined with respect to a fiber bundle direction of the reinforcing fibers at a predetermined twist angle formed between the fiber bundle direction and the filaments of the reinforcing fibers, and
    among the at least two hoop layers, a first hoop layer is located closest to the liner and a second hoop layer is located second closest to the liner, and the twist angle of the reinforcing fibers used for the first hoop layer is larger than the twist angle of the reinforcing fibers used for the second hoop layer, and the twist angle of the reinforcing fibers used for the first hoop layer and the twist angle of the reinforcing fibers used for the second hoop layer are acute angles.

2. The high-pressure container according to claim 1, wherein the at least two hoop layers include at least one other hoop layer that is farther from the liner than the second hoop layer, wherein the closer a hoop layer is to the liner among the at least two hoop layers, the greater the twist angle of the reinforcing fiber used for the hoop layer becomes larger.

3. The high-pressure container according to claim 1, wherein each of the hoop layers is sandwiched between the helical layers.

4. The high-pressure container according to claim 1, wherein in the fiber layer, a layer closest to the liner is the first hoop layer.

5. The high-pressure container according to claim 1, wherein the filaments constituting the first hoop layer are flatter in cross section than the filaments constituting the second hoop layer.

6. A method of manufacturing a high-pressure container in which a fiber layer is formed by winding reinforcing fibers around a liner including a cylindrical body portion and hemispherical closing portions that close one end and another end of the body portion respectively, the method comprising forming the fiber layer by repeating steps a plurality of times, the steps including:
    forming the reinforcing fibers by bundling a plurality of filaments;
    forming a hoop layer by winding the reinforcing fiber in a circumferential direction of the body portion of the liner; and
    forming a helical layer that reinforces the closing portions, by winding the reinforcing fiber in a direction inclined with respect to an axial direction of the liner while forming the reinforcing fiber by bundling the plurality of filaments,
    wherein the reinforcing fibers used for the hoop layer are formed in the forming of the reinforcing fibers by twisting the plurality of filaments so as to be inclined with respect to a fiber bundle direction of the reinforcing fibers at a predetermined twist angle formed between the fiber bundle direction and the filaments of the reinforcing fibers, and
    among the steps repeated a plurality of times in the forming of the fiber layer, a first step includes a first forming of the reinforcing fibers used for a first hoop layer to be located closest to the liner and a second step includes a second forming of the reinforcing fibers used for a second hoop layer to be located second closest to the liner, and the twist angle of the reinforcing fibers used for the first hoop layer is larger than the twist angle of the reinforcing fibers used for the second hoop layer, and the twist angle of the reinforcing fibers used for the first hoop layer and the twist angle of the reinforcing fibers used for the second hoop layer are acute angles.

7. The method of manufacturing the high-pressure container according to claim 6, wherein among the steps repeated a plurality of times in the forming of the fiber layer, at least one other step includes at least one other forming of the reinforcing fibers used for at least one other hoop layer that is farther from the liner than the second hoop layer, wherein the closer a hoop layer is to be located to the liner, the greater the twist angle of the reinforcing fiber used for the hoop layer.

* * * * *